United States Patent

Seki

(10) Patent No.: US 12,145,812 B2
(45) Date of Patent: Nov. 19, 2024

(54) PARTICULATE MATERIAL SUPPLY APPARATUS

(71) Applicant: TSUKASA CO., LTD., Aichi (JP)

(72) Inventor: Tomonori Seki, Aichi (JP)

(73) Assignee: TSUKASA CO., LTD., Aichi (JP)

( * ) Notice: Subject to any disclaimer, the term of this patent is extended or adjusted under 35 U.S.C. 154(b) by 221 days.

(21) Appl. No.: 18/050,503

(22) Filed: Oct. 28, 2022

(65) Prior Publication Data

US 2023/0107336 A1    Apr. 6, 2023

Related U.S. Application Data

(63) Continuation of application No. PCT/JP2021/038293, filed on Oct. 15, 2021.

(30) Foreign Application Priority Data

Oct. 19, 2020  (JP) ................. 2020-175451

(51) Int. Cl.
    *B65G 65/46*    (2006.01)
(52) U.S. Cl.
    CPC .................... *B65G 65/46* (2013.01)
(58) Field of Classification Search
    CPC ........ B65G 65/46; B65G 65/40; B65G 69/00; B65G 2201/042; G01G 19/30; G01G 13/02

See application file for complete search history.

(56) References Cited

U.S. PATENT DOCUMENTS

| 11,333,546 | B2 * | 5/2022 | Takeichi | ............... G01G 19/393 |
| 2020/0061695 | A1 * | 2/2020 | Ogyu | .................... G01G 13/16 |

FOREIGN PATENT DOCUMENTS

| CN | 210135986 U | 3/2020 |
| JP | 2002086438 A | 3/2002 |
| JP | 2014213497 A | 11/2014 |
| JP | 2018127335 A | 8/2018 |
| JP | 2019131378 A | 8/2019 |
| WO | 2020184632 A1 | 9/2020 |

OTHER PUBLICATIONS

International Search Report from International Application No. PCT/JP2021/038293 mailed Jan. 11, 2022.

* cited by examiner

*Primary Examiner* — Donnell A Long
(74) *Attorney, Agent, or Firm* — Shih IP Law Group, PLLC.

(57) ABSTRACT

One object is to provide a particulate material supply apparatus of a simple configuration provided with leakage preventing portions configured to receive a particulate material falling out from a feed port during stop of supply of the particulate material and not to interfere with the supply of the particulate material from the feed port during supply of the particulate material. There is provided a particulate material supply apparatus of the present disclosure comprising a main body; a plurality of stockers; and a plurality of leakage preventing portions. The stocker comprises a charging port configured to cause the particulate material to be charged into inside of the stocker; and a feed portion configured to supply the particulate material stored inside of the stocker from a feed port. The leakage preventing portion comprises a receiving member and a driving portion.

4 Claims, 4 Drawing Sheets

PARTICULATE MATERIAL SUPPLY APPARATUS

TECHNICAL FIELD

The present disclosure relates to a particulate material supply apparatus and more specifically relates to a particulate material supply apparatus provided with leakage preventing portions.

BACKGROUND

In a particulate material supply apparatus configured to supply a particulate material, a start of the supply and a subsequent stop of the supply cause the particulate material to remain in the vicinity of a feed port. The particulate material remaining in the vicinity of the feed port is likely to fall apart and fall out from the feed port due to a vibration or the like.

In the case of stopping the supply, it is ideal to stop the supply of the particulate material immediately after a stop of driving of the particulate material supply apparatus. Depending on the properties of the particulate material, however, even after a stop of driving of the particulate material supply apparatus, the supply of the particulate material may not be stopped promptly, but the particulate material remaining in the vicinity of the feed port may be kept supplied unintentionally.

In order to solve the problem described above, Patent Literature 1 discloses a particulate material supply apparatus that is configured to supply a particulate material and that comprises a casing having an internal space configured to receive the particulate material therein; a transfer path having an upstream side connected with the casing and an opening in a downstream end portion thereof, a transfer mechanism configured to transfer the particulate material from an upstream side of the transfer path to a downstream side; a cover portion provided in the downstream end portion of the transfer path and configured to closely adhere to the opening by a suction force generated by a negative pressure inside of the transfer path; and an air blow portion configured to make a flow of air current that presses back the particulate material in the downstream end portion of the transfer path toward the upstream side in the state that the cover portion closely adheres to the opening.

CITATION LIST

Patent Literature

Patent Literature 1: JP2019-131378

SUMMARY OF THE INVENTION

Technical Problem

The particulate material supply apparatus described in Patent Literature 1 changes the pressure in the transfer path in the process of opening and closing the cover portion and thereby requires an additional device, such as a suction blower. This increases the number of required devices and complicates the device configuration.

One object of the present disclosure is accordingly to provide a particulate material supply apparatus of a simple configuration provided with leakage preventing portions configured to receive a particulate material falling out from a feed port during stop of supply of the particulate material and not to interfere with the supply of the particulate material from the particulate material supply apparatus during supply of the particulate material.

Solution to Problem

According to an aspect of the invention, there is a particulate material supply apparatus that comprises a main body, a plurality of stockers that are configured to store a particulate material inside thereof and that are connectable with the main body and a plurality of leakage preventing portions. The stocker comprises a charging port configured to cause the particulate material to be charged into inside of the stocker and a feed portion provided with a feed port and configured to supply the particulate material stored inside of the stocker from the feed port. The leakage preventing portion comprises a receiving member configured to receive the particulate material falling out from the feed port and a driving portion configured to move the receiving member. The receiving member is movable by the driving portion to a first position to receive the particulate material falling out from the feed port and to a second position to supply the particulate material from the feed port. The feed port is placed above an upper opening of a container for measuring of the particulate material. The receiving member is movable to a location above the upper opening.

This configuration enables the stocker to supply the particulate material stored inside thereof from the feed port of the feed portion and enables the receiving member to receive the particulate material. Furthermore, this configuration enables the position of the receiving member to be moved by the driving portion. This configuration increases the accuracy of measurement of the particulate material.

In the case where the particulate material is not supplied from the supply apparatus, this configuration enables the receiving member of the leakage preventing portion to be located by the driving portion of the leakage preventing portion at the first position to receive the particulate material falling out from the feed port of the feed portion and thereby enables the receiving member to prevent a leakage of the particulate material from the feed port. In the case where the particulate material is supplied by the feed portion, this configuration enables the receiving member of the leakage preventing portion to be located by the driving portion of the leakage preventing portion at the second position to supply the particulate material from the feed port of the feed portion and thereby enables the feed portion to supply the particulate material without interference of the supply with the receiving member.

The description hereof employs the following definition of the term. The "particulate material" includes a powdery body, a granular body and a mixture of the powdery body and the granular body. The application of the particulate material is not limited but may be, for example, any of food products, medical products, construction and civil engineering materials and semiconductors.

The expression of "supplying the particulate material from the feed port" means that the particulate material is discharged from the feed port to outside of the stocker. For example, the discharged particulate material falls down to be stored in a container and is supplied for the purpose of measuring the weight of the particulate material in the container by using a measuring device.

The "leakage" means that the particulate material falls out from the feed port due to a vibration or the like and is unintentionally supplied, in the state that the stocker does not supply the particulate material from the feed port. The falling amount is affected by an angle of rest of the particulate material.

The "feed portion" is, for example, a screw conveyor or a screw feeder but may be another particulate material feed portion having a transfer function of the particulate material, for example, a vibrating feeder or a belt conveyor.

The "receiving member" is, for example, a box-like body or a disk-shaped body having an opening on an upper side thereof and is configured to receive the particulate material and keep the particulate material inside thereof.

The "driving portion" is not specifically limited but may be any existing driving portion, for example, a hydraulic cylinder, pneumatic cylinder, or a motor.

The expression of "receiving the particulate material" means that the particulate material falling out from the feed port is kept by the receiving member.

The expression of "enabling the particulate material to be supplied from the feed port" means that the particulate material discharged from the feed port is suppliable without interference with the receiving member.

It is preferable that a plurality of the stockers are placed radially about the main body such that the feed ports face a center of the main body, and connectable structures to be attached to and detached from the main body. This configuration enables the stocker provided in the particulate material supply apparatus to be replaced with another stocker and simplifies an operation of changing over the particulate material that is to be supplied from the particulate material supply apparatus with another particulate material. Moreover, the connectable structure of the stocker to be attached to and detached from the main body enhances the maintainability of the particulate material supply apparatus.

It is preferable that the particulate material accumulated in the receiving member is supplied in a process of supplying the particulate material by the feed portion. This configuration enables the particulate material accumulated in the receiving member to be additionally supplied and thereby improves the yield. Furthermore, this configuration does not require an operation of removing the particulate material accumulated in the receiving member. Moreover, this configuration enables the empty receiving member to be moved from the second position and the first position and thereby prevents the particulate material from falling out from the receiving member.

It is preferable that the main body includes a main body part and a stand configured to support the main body and has a structure that causes the stocker to be attached to and detached from the stand, and the main body part is provided with a controller that controls supply of the particulate material by the feed portion and driving of the driving portion. This configuration enables the particulate material to be supplied in the area of the stand and increases the control efficiency of the supply of the particulate and of the driving portion.

The particulate material supply apparatus of the present disclosure has the simple configuration to receive a particulate material falling out from a feed port during stop of supply of the particulate material and to supply the particulate material without interference with leakage preventing portions during supply of the particulate material.

DESCRIPTION OF EMBODIMENT

First Embodiment

Figure 1:
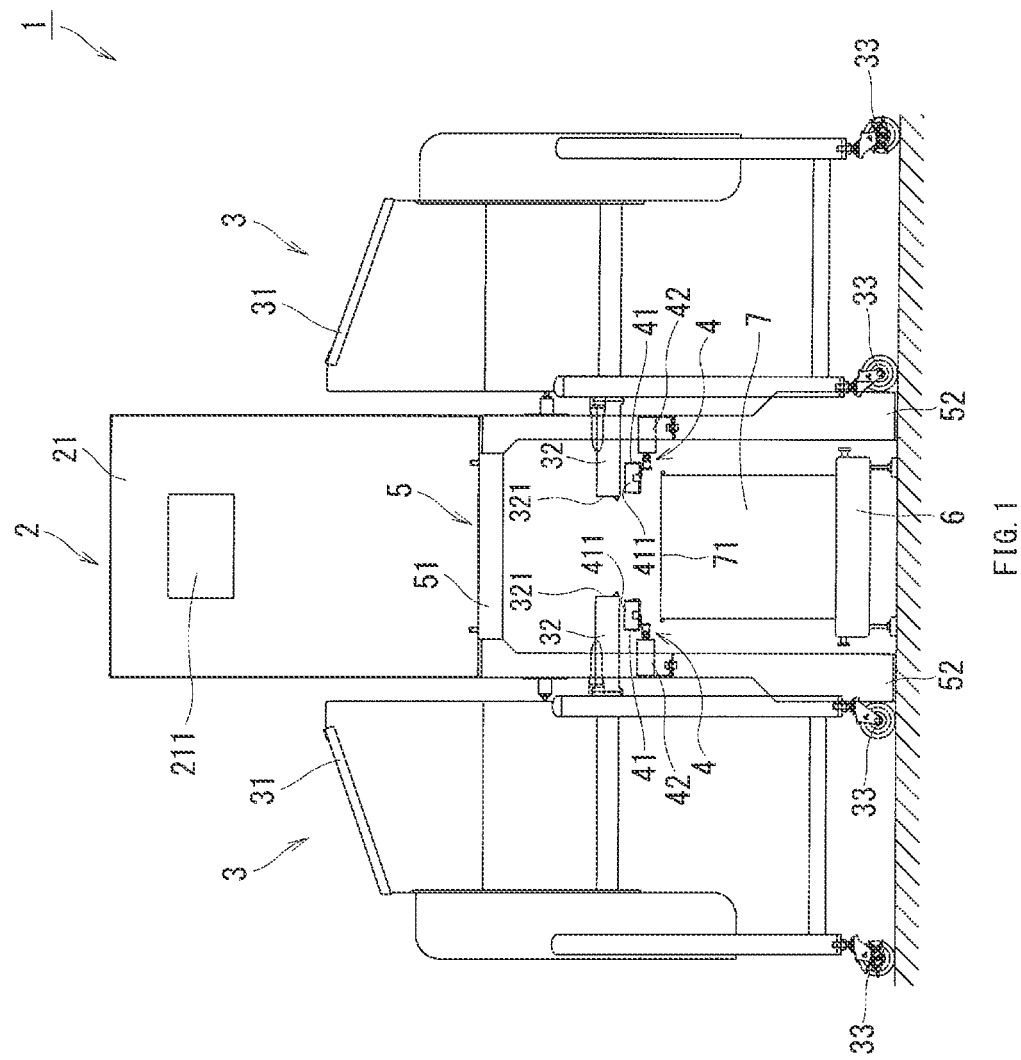
FIG. 1 is a front view illustrating a particulate material supply apparatus according to a first embodiment.

A particulate material supply apparatus 1 (hereinafter referred to as supply apparatus 1) is described with reference to FIGS. 1 to 4. The supply apparatus 1 includes a main body 2, a plurality of stockers 3 that are configured to store particulate material inside thereof and to supply the stored particulate material and that are connectable with the main body 2, and a plurality of leakage preventing portions 4. The supply apparatus 1 further includes a measuring device 6 and a container 7. This configuration is described below with reference to the drawings.

The main body 2 includes a main body part 21 and a stand 5 configured to support this main body part 21 and to enable the stockers 3 to be attached thereto and detached therefrom. This main body part 21 includes a controller 211. The controller 211 controls supply of the particulate material by a feed portion 32 described later and also controls driving of a driving portion 42 described later when the main body 2 is connected with the stocker 3. The control may be manually performed or may be automatically performed based on settings.

The stand 5 includes a mounting portion 51 and a plurality of leg portions 52. The leg portion 52 has a guide receiving portion 53. The stocker 3 is connected with the main body 2 by fitting guide portions 35 of the stocker 3 described later into the guide receiving portions 53. The stand 5 of this embodiment is connectable with four stockers 3. The main body part 21 is placed on the mounting portion 51 of the stand 5 that is hollow inside thereof.

The stocker 3 includes a charging port 31 configured to allow the particulate material to be charged into inside of the stocker 3 and a feed portion 32 configured to supply the particulate material stored inside of the stocker 3 from a feed port 321. The position of supplying the particulate material from the feed port 321 into the container 7 is set in advance. The feed portion 32 according to the embodiment is a cylindrical screw feeder. The stocker 3 further includes a plurality of casters 33 that are provided on a bottom thereof and that include those provided with anti-rotation stoppers, elastic members 34, and guide portions 35 that are to be inserted into the main body 2. The stocker 3 is movable by means of the casters 33.

A plurality of (four in the illustrated example) the stockers 3 are placed radially about the main body 2, such that the feed ports 321 face the center of the main body 2. The remaining part of the feed portion 32 is placed in an internal space of the stocker 3. The particulate material stored in the stocker 3 is supplied from an opening of the feed portion 32 into inside of the feed portion 32.

The stocker 3 has a connectable structure to be attached to and detached from the main body 2. One exemplary structure is a mechanical insertion structure. The stocker 3 is attached to the main body 2 by pressing the stocker 3 in to the main body 2 and inserting the guide portions 35 into the main body 2. The stocker 3 is detached from the main body 2 by pulling out the stocker 3 from the main body 2 and separating the guide portions 35 from the main body 2. In the state that the stocker 3 is attached to the main body 2, the guide portions 35 are inserted in the main body 2 to be fit in the guide receiving portions 53. This configuration fixes the stocker 3 to the main body 2 and prevents the direction of the feed port 321 from being misaligned. The elastic members 34 are members that have elasticity and that serve to buffer an impact, and are placed on an outer side of the guide portions 35. The elastic members 34 are brought into contact with the main body 2 in the state that the stocker 3 is attached to the main body 2. The elastic members 34 prevent the stocker 3 from hitting against the main body 2 and from being broken when the stocker 3 receives an unexpected impact from outside.

Attachment of the stocker 3 to the main body 2 is completed by moving the stocker 3 to a supply position of the particulate material, pressing the guide portions 35 of the stocker 3 and a leading end of the feed portion 32 including the feed port 321 into inside of the stand 5 of the main body 2, activating the anti-rotation stoppers of the casters 33 to fix the position, and connecting the stocker 3 with the main body 2 by a cable (not shown). Detachment of the stocker 3 from the main body 2 is, on the other hand, completed by disconnecting the cable that connects the main body 2 with the stocker 3, releasing the anti-rotation stoppers of the casters 33, pulling out the stocker 3 from the main body 2 and moving the stocker 3 from the supply position of the particulate material. This configuration enables the stocker 3 to be readily attached to and detached from the main body 2 and enables a currently attached stocker 3 to be readily replaced with another stocker 3.

The configuration of enabling one stocker to be replaced with another stocker facilitates a change in the particulate material to be supplied. The configuration of enabling the stocker 3 to be detached from the main body 2 allows for a maintenance of the stocker 3 after detachment from the main body 2 and thereby improves the maintainability of the supply apparatus 1. For example, in the case of a failure of the feed portion 32 or the leakage preventing portion 4, this configuration ensures easy repair and replacement.

The leakage preventing portion 4 includes a receiving member 41 configured to receive the particulate material falling out from the feed port 321, and a driving portion 42 configured to move the receiving member 41. The receiving member 41 is a box-like member having an opening portion 411 that is open on an upper side thereof. The leakage preventing portion 4 is a member extended in a lateral direction. The leakage preventing portion 4 according to the embodiment is placed below the feed portion 32 and has one end fixed to the leg portion 52 of the stand 5. The employable location of the leakage preventing portion 4 is not specifically limited but may be any location that enables the receiving member 41 to be located at a first position A and at a second position B described later.

The receiving member 41 is connected with the driving portion 42 in the state that the opening portion 411 thereof faces upward. This configuration enables the receiving member 41 to receive the particulate material falling down.

The receiving member 41 preferably has the opening portion 411 in such a shape as to become wider upward. This configuration enhances the advantageous effect of preventing leakage of the particulate material from the feed port 321 of the feed portion 32.

The shape of the receiving member 41 is not specifically limited but may be any shape that has the opening portion 411 and that receives the particulate material discharged from the feed port 321. The receiving member 41 may be, for example, a rectangular parallelopiped, a circular body, an ellipsoid, or a polygonal body having the opening portion 411 facing up.

The size of the receiving member 41 is not specifically limited but any size that is sufficient to receive the particulate material falling out from the feed port 321. The size of the receiving member 41 is, however, determined in view of preventing interference with other members including the other receiving members 41.

The material of the receiving member 41 is not specifically limited but may be any appropriate existing material according to the characteristics of the particulate material. Employable examples include existing thermosetting resins, thermoplastic resins and metal material such as stainless steel.

The driving portion 42 serves to move a component connected with the driving portion 42. The driving portion 42 according to the embodiment is a power-driven cylinder. The receiving member 41 is connected with a leading end portion of a piston rod 421 extended from inside of the power-driven cylinder via an L-shaped member. Using the power-driven cylinder enables the receiving member 41 to be moved by hydraulic pressure or by pneumatic pressure. Another example of the driving portion 42 other than the power-driven cylinder is a motor, but the driving portion 42 is not specifically limited.

Figure 3:
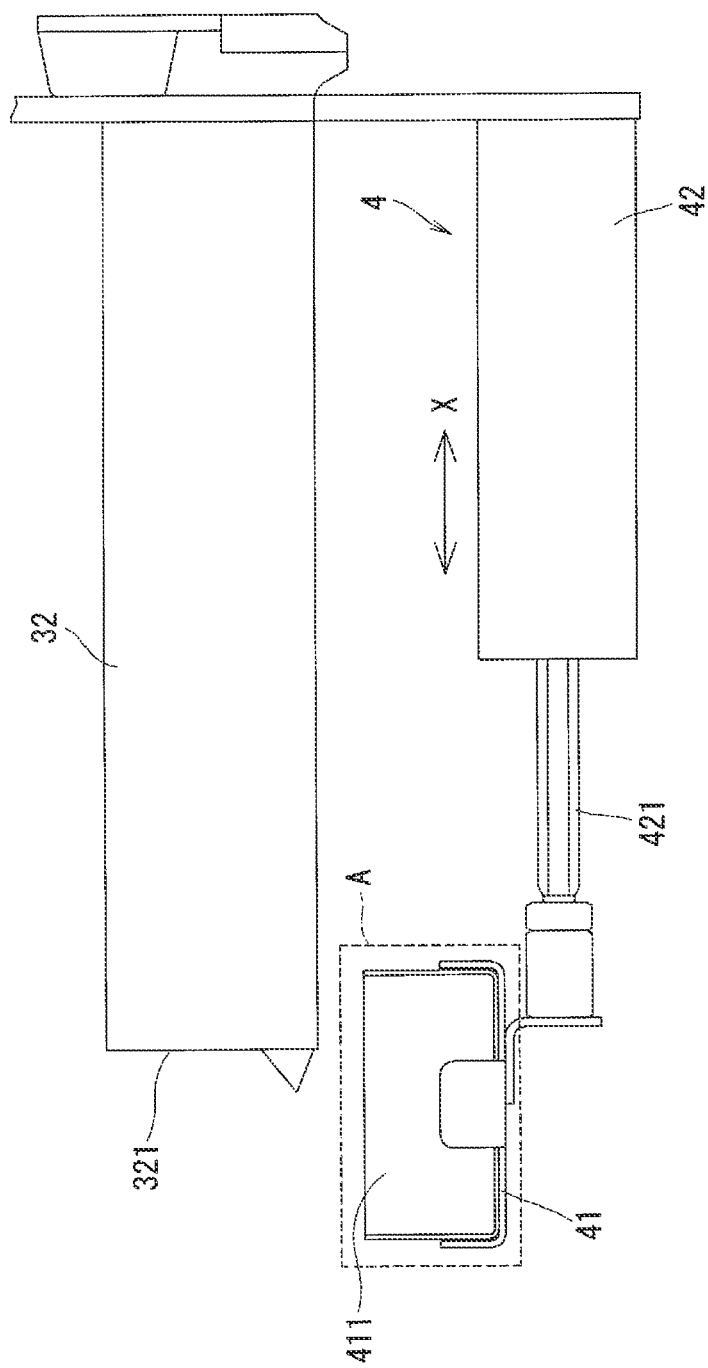
FIG. 3 is a schematic diagram illustrating a leakage preventing portion when particulate material is not supplied from a feed portion according to the first embodiment.
Figure 4:
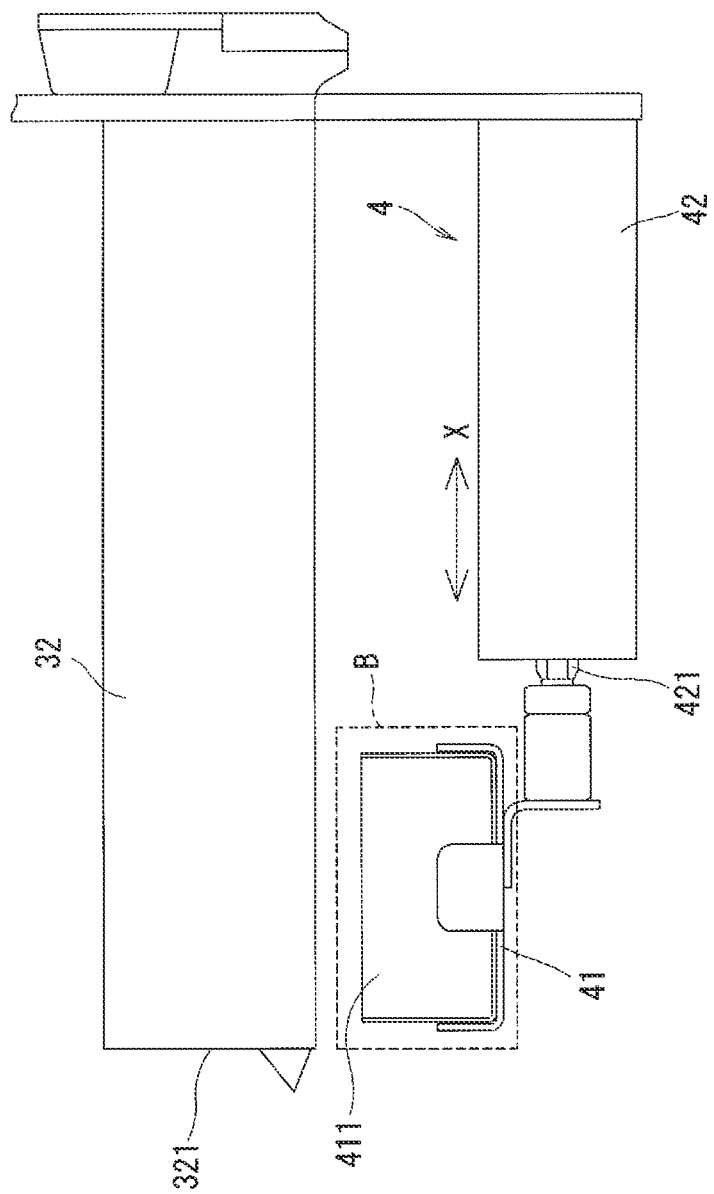
FIG. 4 is a schematic diagram illustrating the leakage preventing portion when the particulate material is supplied from the feed portion according to the first embodiment.

The driving portion 42 enables the receiving member 41 to be moved along an axial direction X of the feed portion 32 to a first position A (a position that allows the particulate material falling out from the feed port 321 to be received as shown in FIG. 3) and to a second position B (a position that allows the particulate material to be supplied from the feed port 321 as shown in FIG. 4). The feed port 321 is located above the receiving member 41 at the first position A and is located diagonally forward and diagonally above a front wall of the receiving member 41 at the second position B.

The driving portion 42 and the feed portion 32 are respectively the power-driven cylinder and the cylindrical screw feeder. The piston rod 421 of the power-driven cylinder is extendable and contractable in an identical direction with an axial direction X of a screw (not shown) of the screw feeder. The receiving member 41 connected with the leading end portion of the piston rod 421 of the power-driven cylinder serving as the driving portion 42 is allowed to move in the identical direction with the axial direction X of the screw of the screw feeder. This configuration enables the receiving member 41 to be moved to the first position A and to the second position B.

Figure 2:
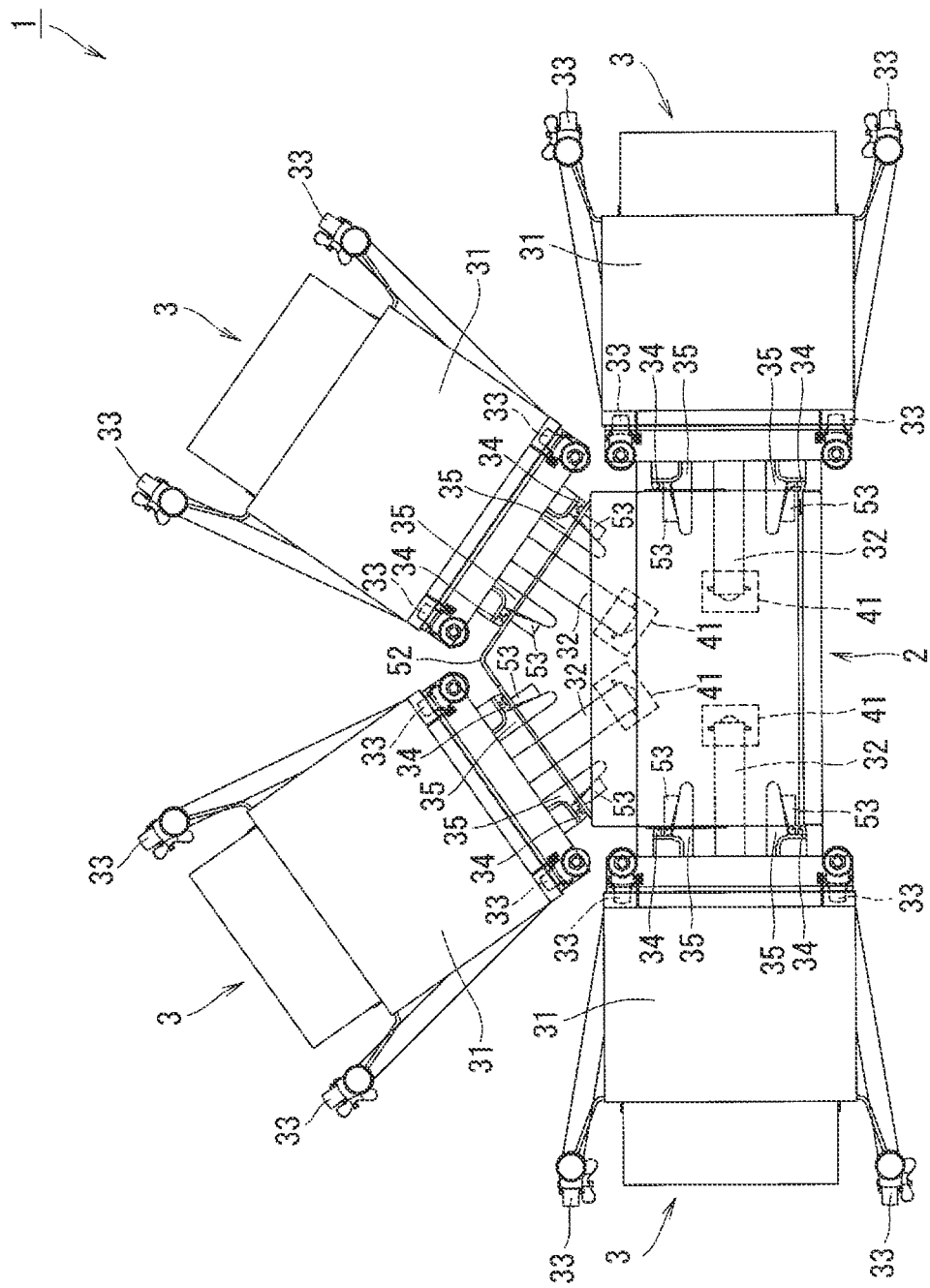
FIG. 2 is a plan view illustrating the particulate material supply apparatus according to the first embodiment.

When the particulate material is not supplied from the feed portion 32, as shown in FIG. 3, the receiving member 41 is located by the driving portion 42 at the first position A to receive the particulate material falling out from the feed port 321. Accordingly, the particulate material falling out from the feed port 321 is receivable by the receiving member 41 of the leakage preventing portion 4 as shown in FIG. 2 and FIG. 3.

When the particulate material is supplied from the feed portion 32, as shown in FIG. 4, the receiving member 41 is located by the driving portion 42 at the second position B to enable the particulate material to be supplied from the feed port 321. Accordingly, the particulate material is suppliable from the feed port 321 without being received by the receiving member 41 of the leakage preventing portion 4.

The measuring device 6 and the container 7 for measuring that enables the particulate material to be stored therein and that is mounted above the measuring device 6 are placed inside of the stand 5. The stocker 3 is attached to the main body 2 in the state that the vicinity of a leading end of the feed portion 32 including the feed port 321 is inserted into inside of the stand 5. The feed port 321 is located above an upper opening 71 of the container 7 at a position that is above the container 7 and that enables the particulate material to be supplied to inside of the container 7. The receiving member 41 is movable to a location that is above the upper opening 71 and that is below the feed port 321.

The weight of the particulate material supplied from the supply apparatus 1 and stored in the container 7 is measurable by the measuring device 6. Connecting the main body 2 with the measuring device 6 by a cable (not shown) enables the main body 2 to control the supply flow rate of the particulate material that is to be supplied from the stocker 3, according to the weight of the particulate material that is stored in the container 7 and that is measured by the measuring device 6. The measuring device 6 employable may be a measuring device provided thereon with a conveyor that allows the container 7 to be transferred. Employing such a measuring device 6 facilitates transfer and installation of the container 7. The conveyor may be, for example, a roller conveyor or a belt conveyor. The configuration of the supply apparatus 1 enabling the main body 2 to control the supply flow rate of the particulate material that is to be supplied from the stocker 3 and enabling the receiving member 41 of the leakage preventing portion 4 to receive the particulate material falling out from the feed port 321 as described above enables a predetermined weight of the particulate material to be supplied from the stocker 3 to the container 7 with high accuracy.

The following describes a procedure of operating the supply apparatus 1. The stocker 3 is attached to the main body 2. The number of the stockers 3 attached to the main body 2 may be any number. The number of the stockers 3 attached may be determined by taking into account, for example, the type and the amount of the particulate material to be supplied. The timing of charging the particulate material that is to be stored inside of the stocker 3 may be any timing prior to supply of the particulate material. In terms of the operability, it is preferable to attach the stocker 3 to the main body 2 after the particulate material is charged into the stocker 3.

In the state that the stocker 3 is not attached to the main body 2, the receiving member 41 of the leakage preventing portion 4 is located at the first position A. Even in the state that the stocker 3 is attached to the main body 2, when the supply of the particulate material from the stocker 3 is not started, the receiving member 41 of the leakage preventing portion 4 is also located at the first position A. Even in the case where the particulate material falls out from the feed port 321 in the course of attachment of the stocker 3 to the main body 2, this configuration enables the falling particulate material to be received by the receiving member 41 located at the first position A and thereby prevents leakage of the particulate material.

The controller 211 of the main body 2 is operated to supply the particulate material from the stocker 3 attached to the main body 2. In this state, the receiving member 41 located below the stocker 3 which supplies the particulate material is moved by the driving portion 42 from the first position A to the second position B before the particulate material is supplied from the feed port 321. This configuration enables the particulate material to be supplied from the stocker 3 without interference with the receiving member 41.

The supply of the particulate material from the stocker 3 is stopped manually or automatically. In this state, the receiving member 41 located below the stocker 3 which stops the supply of the particulate material is moved by the driving portion 42 from the second position B to the first position A after the supply of the particulate material from the feed port 321 is stopped. Like in the case where the supply of the particulate material from the stocker 3 is not started as described above, even in the case where the particulate material falls out from the feed port 321, this configuration enables the falling particulate material to be received by the receiving member 41 located at the first position and thereby prevents leakage of the particulate material. Unlike the stocker 3 which stops the supply of the particulate material as described above, the receiving member 41 located below another stocker 3 that is kept the supply of the particulate material stopped, is kept at the first position A. This configuration enables the particulate material falling out from the feed port 321 of another stocker 3 to be received by the receiving member 41 and thereby prevents leakage of the particulate material.

The start and the stop of supply of the particulate material from the stocker 3 described above may be repeated an arbitrary number of times according to the state of the supply operation. Every time the supply of the particulate material from the stocker 3 is started or stopped, the receiving member 41 located below the stocker 3 is moved. This configuration also prevents leakage of the particulate material.

In the case where the particulate material is supplied from the plurality of stockers 3, the respective stockers 3 sequentially supply the particulate material one by one. In this case, the receiving member 41 located below the stocker 3 which supplies the particulate material is located at the second position B, while the receiving member 41 located below the stocker 3 which does not supply the particulate material is located at the first position A. This configuration enables the weight of the particulate material supplied from each of the stockers 3 to the container 7 to be measured.

When it is determined by the measuring device 6 that the weight of the particulate material stored in the container 7 reaches a set weight, one cycle of the particulate material supply process is terminated. The container 7 is then carried out, and a new container 7 is installed, and a next cycle of the particulate material supply process is performed.

After completion of all the cycles of the particulate material supply process, the stockers 3 are detached from the main body 2. In this state, the supply of the particulate material from the stockers 3 is at stop, so that the receiving members 41 located below the respective stockers 3 are located at the first position A. Even when the particulate material falls out from the feed port 321 in the course of detachment of the stocker 3 from the main body 2, this configuration enables the falling particulate material to be received by the receiving member 41 located at the first position A and thereby prevents leakage of the particulate material.

Second Embodiment

According to a second embodiment of the present disclosure, the receiving member 41 located below the stocker 3 is additionally rotated or the like in the process of supplying the particulate material from the stocker 3. This configuration enables the particulate material accumulated in the receiving member 41 to be supplied into the container 7.

This configuration improves the yield by supplying the particulate material accumulated in the receiving member 41. Furthermore, this configuration enables the empty receiving member 41 to be moved from the first position A to the second position B when the supply of the particulate material from the stocker 3 is stopped and thereby prevents the particulate material from falling out from the receiving member 41.

The method of supplying the particulate material accumulated in the receiving member 41 is not specifically limited. One exemplary method may open a door that is provided on a bottom face of the receiving member 41. Another exemplary method may rotate the receiving member 41 such as to cause the particulate material accumulated in the receiving member 41 to be dropped and supplied from the opening portion 411.

The other configuration of the particulate material supply apparatus 1 according to the second embodiment is similar to that of the supply apparatus 1 according to the first embodiment, so that the like components are expressed by the like reference signs and the description of the first embodiment is applied to this embodiment.

The following describes a procedure of operation of the supply apparatus 1 according to this embodiment. The operations other than the operation of supplying the particulate material from the stocker 3 attached to the main body 2 are similar to those of the first embodiment, so that the description of the first embodiment is applied to these operations of this embodiment.

In the process of supplying the particulate material from the stocker 3 attached to the main body 2, the receiving member 41 located below the stocker 3 which supplies the particulate material is first rotated to supply the particulate material accumulated in the receiving member 41. The leakage preventing portion 4 is then returned to the original position such as to enable the receiving member 41 to receive the particulate material. The receiving member 41 is subsequently moved by the driving portion 42 from the first position A to the second position B prior to the supply of the particulate material from the feed port 321. This configuration enables the particulate material to be supplied from the stocker 3 without interference with the receiving member 41.

The present disclosure is not limited to the description of the above embodiments but may be changed, modified and altered without departing from the scope of the technical ideas of the present disclosure. The changes, modifications, alterations and equivalents thereof are included in the technical scope of the present disclosure. For example, the number of the stockers 3 attached to the main body 2 is four according to the above embodiments, but may be any appropriate number, for example, 1, 2, 3, 5 or the like. The above embodiments use the leakage preventing portion 4 to measure the weight of the particulate material supplied to the container 7. The configuration of the present invention is also applicable to particulate material processing devices in other applications.

REFERENCE NUMERALS

1 particulate supply apparatus
2 main body
21 main body part
211 controller
3 stocker
31 charging port
32 feed portion
321 feed port
33 caster
34 elastic member
35 guide portion
4 leakage preventing portion
41 receiving member
411 opening portion
42 driving portion
421 piston rod
5 stand
51 mounting portion
52 leg portion
53 guide receiving portion
6 measuring device
7 container
71 upper opening
A first position
B second position

What is claimed is:

1. A particulate material supply apparatus, comprising:
a main body;
a plurality of stockers that are configured to store a particulate material inside thereof and that are connectable with the main body; and
a plurality of leakage preventing portions, wherein
the stocker comprises:
 a charging port configured to cause the particulate material to be charged into inside of the stocker; and
 a feed portion provided with a feed port and configured to supply the particulate material stored inside of the stocker from the feed port, and
the leakage preventing portion comprises:
 a receiving member configured to receive the particulate material falling out from the feed port; and
 a driving portion configured to move the receiving member, wherein
the receiving member is movable by the driving portion to a first position to receive the particulate material falling out from the feed port and to a second position to supply the particulate material from the feed port, wherein
the feed port is placed above an upper opening of a container for measuring of the particulate material, and
the receiving member is movable to a location above the upper opening.

2. The particulate material supply apparatus according to claim 1,
wherein a plurality of the stockers are placed radially about the main body such that the feed ports face a center of the main body, and connectable structures to be attached to and detached from the main body.

3. The particulate material supply apparatus according to claim 1,
wherein the particulate material accumulated in the receiving member is supplied in a process of supplying the particulate material by the feed portion.

4. The particulate material supply apparatus according to claim 1,
wherein the main body includes a main body part and a stand configured to support the main body and has a structure that causes the stocker to be attached to and detached from the stand, and
the main body part is provided with a controller that controls supply of the particulate material by the feed portion and driving of the driving portion.

* * * * *